US006771781B2

(12) United States Patent
Chattin

(10) Patent No.: US 6,771,781 B2
(45) Date of Patent: Aug. 3, 2004

(54) VARIABLE DAMPING CIRCUIT FOR A LOUDSPEAKER

(76) Inventor: Daniel A. Chattin, 75 Perkins Hill Rd., Harwington, CT (US) 06791

( * ) Notice: Subject to any disclaimer, the term of this patent is extended or adjusted under 35 U.S.C. 154(b) by 623 days.

(21) Appl. No.: 09/851,023

(22) Filed: May 8, 2001

(65) Prior Publication Data

US 2002/0168072 A1 Nov. 14, 2002

(51) Int. Cl.[7] .......................... H04B 3/00; H04B 15/00; H04R 29/00

(52) U.S. Cl. .............................. 381/77; 55/59; 55/94.9

(58) Field of Search .............................. 381/59, 58, 55, 381/94.9, 77; 333/124, 17.3, 32

(56) References Cited

U.S. PATENT DOCUMENTS

| | | | | | |
|---|---|---|---|---|---|
| 3,849,602 | A | | 11/1974 | Gendin | |
| 4,260,954 | A | * | 4/1981 | Crooks | 330/85 |
| 4,475,233 | A | | 10/1984 | Watkins | |
| 4,583,245 | A | * | 4/1986 | Gelow et al. | 381/59 |
| 4,606,071 | A | * | 8/1986 | White, Jr. | 381/99 |
| 4,675,835 | A | * | 6/1987 | Pfleiderer | 702/103 |
| 4,718,100 | A | | 1/1988 | Brisson | |
| 4,817,162 | A | | 3/1989 | Kihara | |
| 4,908,870 | A | * | 3/1990 | Nagi | 381/96 |
| 4,939,315 | A | | 7/1990 | Palmer | |
| 4,945,189 | A | | 7/1990 | Palmer | |
| 5,033,091 | A | | 7/1991 | Bond | |
| 5,123,052 | A | | 6/1992 | Brisson | |
| 5,206,912 | A | * | 4/1993 | Noro | 381/96 |
| 5,373,563 | A | * | 12/1994 | Kukurudza | 381/94.9 |
| 5,736,897 | A | * | 4/1998 | Gagon | 330/126 |
| 6,163,613 | A | * | 12/2000 | Cowans | 381/55 |
| 6,466,678 | B1 | * | 10/2002 | Killion et al. | 381/314 |
| 6,566,960 | B1 | * | 5/2003 | Carver | 330/297 |

* cited by examiner

*Primary Examiner*—Minsun Oh Harvey
*Assistant Examiner*—Laura A. Grier
(74) *Attorney, Agent, or Firm*—Malcolm Chisholm, Jr.

(57) ABSTRACT

The invention is a variable damping circuit for a loudspeaker that provides for frequency dependent control of a loudspeaker by an amplifier. The variable damping circuit includes an amplifier, at least one loudspeaker, a pair of connectors between the amplifier and the loudspeaker, and a reactive component wired in parallel with a resistor connected to one of the pair of connectors between the amplifier and loudspeaker, wherein the resistance value of the reactive component and resistor does not exceed fifty percent of a resistance value of the loudspeaker. The reactive component may be a coil, a capacitor, or both a coil and a capacitor both of which are connected in parallel with the resistor.

11 Claims, 2 Drawing Sheets

EFFECTIVE RESISTANCE OF AN EXEMPLARY VARIABLE DAMPING CIRCUIT

VARIABLE DAMPING CIRCUIT FOR A LOUDSPEAKER

TECHNICAL FIELD

The present invention relates to loudspeaker systems and in particular relates to a circuit for providing greater accuracy of sound reproduction by a loudspeaker.

BACKGROUND OF THE INVENTION

It is well known that high fidelity loudspeakers have substantially improved in quality in recent years, yet they still suffer from persistent problems. Many of the problems are associated with component audio reproduction systems wherein differing power amplifiers may be utilized with a variety of differing loudspeakers and the different amplifiers and loudspeakers have distinct operating characteristics. A major problem associated with matching amplifiers and loudspeakers is associated with a tendency of a speaker to continue to mechanically move after being driven by electrical power delivered to the loudspeaker from the amplifier. As the speaker continues to move after the electrical power ceases, the speaker generates a voltage at the speaker's input that travels along the circuit between the speaker and amplifier. The voltage is commonly referred to as back electromotive force ("EMF"), which is short circuited by a low output resistance of the amplifier. This short circuiting effect provided by the amplifier is referred to as electrical damping and has a braking effect upon continued movement of the loudspeaker. Amplifiers and connected speakers are referred to as having a specific "damping factor" which is a ratio of speaker resistance to the low output resistance of the amplifier. For example, standard loudspeaker having a resistance of 8 ohms and an amplifier having a low output resistance or impedance of 0.20 ohms would have a damping factor of 40 (8.0/0.20). It is also well known that any resistance introduced between the amplifier and the loudspeaker lessens the damping effect of the amplifier. Different loudspeakers generate different back EMF, and hence it is difficult to match an amplifier to accommodate varying back EMF characteristics of a variety of loudspeakers.

Many efforts have been undertaken to better control the back EMF generated by loudspeakers. For example, U.S. Pat. No. 5,033,091 that issued on Jul. 16, 1991 to Bond shows usage of an unterminated connector with a pair of terminated connectors between positive and negative terminals of an amplifier and a loudspeaker, and in one embodiment the unterminated connector includes a rheostat to vary the resistance of the connector and thereby better match a particular speaker with an amplifier. Bond thereby endeavors to achieve a fixed damping of back EMF of a speaker by selecting electrical connectors having an unterminated connector that optimize a fixed, non-frequency variable resistive damping between a loudspeaker and an amplifier.

Many amplifier and loudspeaker systems endeavor to enhance quality by using frequency cross-over circuits and other signal frequency enhancing components, as is well known. However such additional circuits include reactive components, such as coils and capacitors, that also create their own back EMF, giving rise to additional problems for faithful reproduction of sound by the loudspeaker in the system. For example, U.S. Pat. No. 4,475,233 that issued on Oct. 2, 1984 to Wadkins shows an effort to dampen the reactive components of traditional frequency cross-over and frequency shaping circuits by the provision of damping resistors connected in shunt with the reactive components of the circuits.

Additionally, speaker damping requirements vary with frequency of the current generated by the amplifier, and with mechanical characteristics of the loudspeaker, and no known amplifier loudspeaker systems have adequately solved variable damping problems. In each amplifier loudspeaker system, three forms of damping must be addressed. Acoustic damping refers to damping of the speaker by sound waves generated within a cabinet containing the loudspeaker that tend to effect motion of the speaker in response to sound waves generated by motion of the speaker as it is driven by the current from the amplifier. Mechanical damping refers to impact on motion of the speaker through materials and apparatus that suspend the speaker within a mounting housing for securing the speaker to the cabinet. For example, a typical high fidelity loudspeaker has a metal housing that surrounds, partially encases, and supports a moveable cone of the speaker, and that also supports a magnet that drives the loudspeaker cone. Variations in the materials suspending the cone to the metal housing will impact mechanical damping of the speaker resulting in variations in sound reproduction that are a function of the mechanical damping. Electrical damping refers to the back EMF current generated within the magnet and coil of the speaker that occurs as the cone of the speaker continues movement by inertia after being driven in response to a current from the amplifier. No known technology effectively achieves total damping of all aforesaid sources of damping across a working frequency range of the loudspeaker and amplifier system.

SUMMARY OF THE INVENTION

The invention is a variable damping circuit for a loudspeaker that provides for frequency dependent control of a loudspeaker by an amplifier. The variable damping circuit includes an amplifier, at least one loudspeaker, a pair of connectors between the amplifier and the loudspeaker, and a reactive component wired in parallel with a resistor and connected to one of the pair of connectors between the amplifier and loudspeaker, wherein the total resistance value of the reactive component and resistor combined does not exceed fifty percent of a resistance value of the loudspeaker. In a first preferred embodiment, the reactive component is a coil. In a second preferred embodiment, the reactive component is a capacitor, and, in a third preferred embodiment, both the coil and the capacitor are connected in parallel with the resistor.

The resistance value of the coil and/or capacitor changes in response to a frequency of a current passing through the reactive component and resistor. The change in resistance value of the reactive component is tempered by the resistor in parallel with the reactive component such that the highest value obtainable by the reactive component and resistor combined is less than that of the resistor, and the lowest value will be less than the resistance value of the reactive component. Because of the aforesaid total resistance values of the coil and/or of the capacitor, the combination of the reactive component in parallel with the resistor imparts only a negligible change in voltage or power delivered to the loudspeaker from the amplifier. Therefore, the variable damping circuit serves to tune the loudspeaker by dynamically altering the total damping factor produced by the loudspeaker without impeding the amplifier current or artificially shaping the frequency of the current delivered by the amplifier to the loudspeaker. By controlling the effective resistance between the amplifier and loudspeaker to be a function of the frequency of a back EMF current passing through the reactive component and the resister instead of attempting to eliminate the back EMF, the variable damping circuit utilizes the back EMF to variably tune the loudspeaker at all frequencies of amplifier current and loudspeaker. Therefore, the loudspeaker and amplifier are precisely coupled to optimize a total damping across a working frequency range of the loudspeaker with a lowest possible distortion.

Accordingly, it is a general object of the present invention to provide variable damping circuit for a loudspeaker that overcomes deficiencies of prior art loudspeaker damping circuits.

It is a more specific object to provide a variable damping circuit for a loudspeaker that enables a loudspeaker to be tuned to an amplifier utilizing the back electromotive force ("EMF") current as a means of control.

It is yet another object to provide a variable damping circuit for a loudspeaker that provides for frequency dependent damping of the loudspeaker by utilizing the back EMF.

It is still a further object to provide a variable damping circuit for a loudspeaker that optimizes a total damping across a working frequency range of an amplifier current supplied to the loudspeaker.

These and other objects and advantages of this invention will become more readily apparent when the following description is read in conjunction with the accompanying drawings.

DESCRIPTION OF THE PREFERRED EMBODIMENTS

Figure 1:
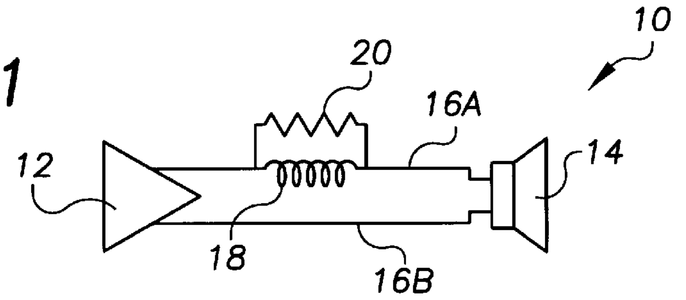
FIG. 1 is a schematic circuit diagram of a first embodiment of a variable damping circuit for a loudspeaker constructed in accordance with the present invention.

Referring to the drawings in detail, a first embodiment of a variable damping circuit is shown in FIG. 1, and is generally designated by the reference numeral 10. The variable damping circuit includes an amplifier 12, at least one loudspeaker 14, a pair of connectors 16A, 16B electrically connected between the amplifier 12 and loudspeaker 14, and a coil 18 reactive component wired in parallel with a resistor 20 on one of the connectors 16A, 16B (such as on 16A as shown in FIG. 1), wherein the resistance value of the coil 18 and the resistor 20 does not exceed fifty percent of a resistance value of the loudspeaker 14.

Figure 2:
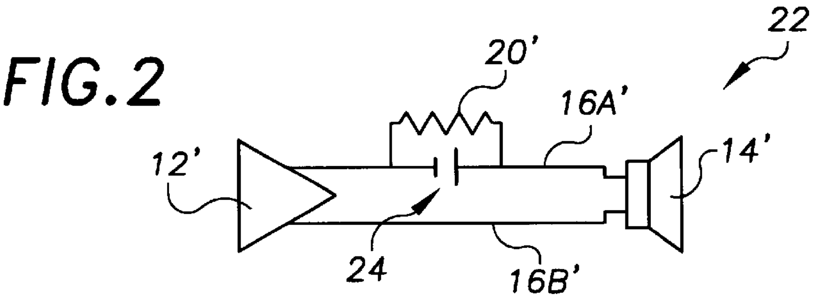
FIG. 2 is a schematic circuit diagram of a second embodiment of a variable damping circuit for a loudspeaker constructed in accordance with the present invention.

A second preferred embodiment of a variable damping circuit for a loudspeaker is shown in FIG. 2 and is generally designated by the reference numeral 22, wherein the same components that appear in FIG. 1 that also appear in FIG. 2 are designated by primes of the reference numerals appearing in FIG. 1. The second preferred embodiment 22 includes an amplifier 121, at least one loudspeaker 14', a pair of connectors 16A', 16B' electrically connected between the amplifier 12' and loudspeaker 14', and a capacitor 24 reactive component wired in parallel with a resistor 20' on one of the connectors 16A', 16B' (such as on 16A' as shown in FIG. 2), wherein the resistance value of the capacitor 24 and the resistor 20' does not exceed fifty percent of a resistance value of the loudspeaker 14'.

Figure 3:
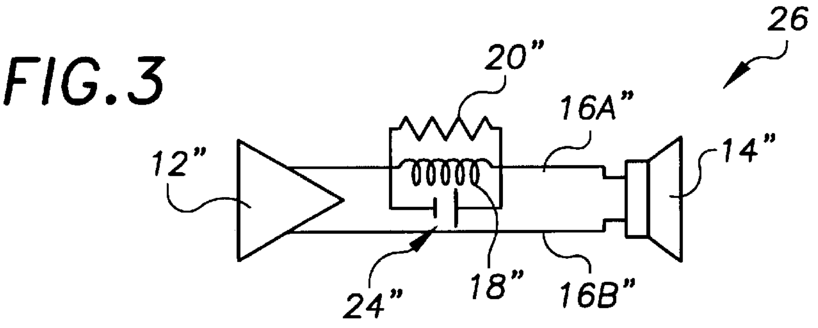
FIG. 3 is a schematic circuit diagram of a third embodiment of a variable damping circuit for a loudspeaker constructed in accordance with the present invention.

A third preferred embodiment of the variable damping circuit is shown in FIG. 3 and is generally designated by the reference numeral 26, wherein the same components that appear in FIGS. 1 and 2 are designated by double primes of the reference numerals appearing in FIG. 1 or 2. The third preferred embodiment 26 includes an amplifier 12", at least one loudspeaker 14", a pair of connectors 16A", 16B" electrically connected between the amplifier 12" and loudspeaker 14", and a capacitor 24' wired in parallel with a resistor 20", and a coil 18" wired in parallel with the capacitor 24" and resistor 20" on one of the connectors 16A", 16" (such as on 16A" as shown in FIG. 3), wherein the resistance value of the capacitor 24", coil 18" and the resistor 20" does not exceed fifty percent of a resistance value of the loudspeaker 14". The resistor 20, coil 18 and capacitor 24 may be any resistors, coils or capacitors known in the art that are capable of being used in audio reproduction systems.

Figure 4:
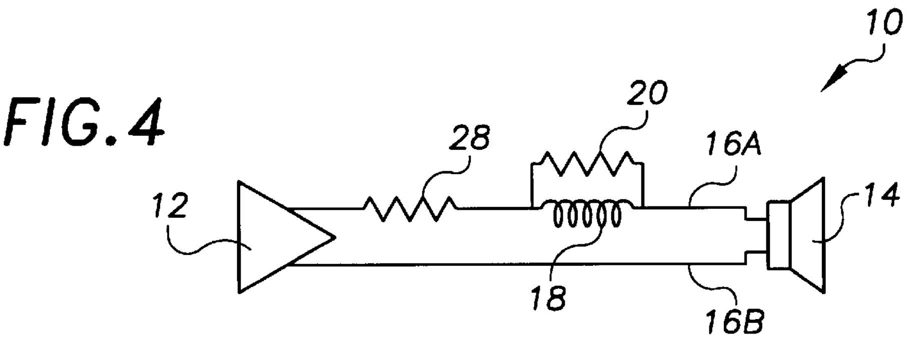
FIG. 4 is a schematic circuit diagram of the first embodiment of the variable damping circuit showing wiring of a first additional resistor.
Figure 5:
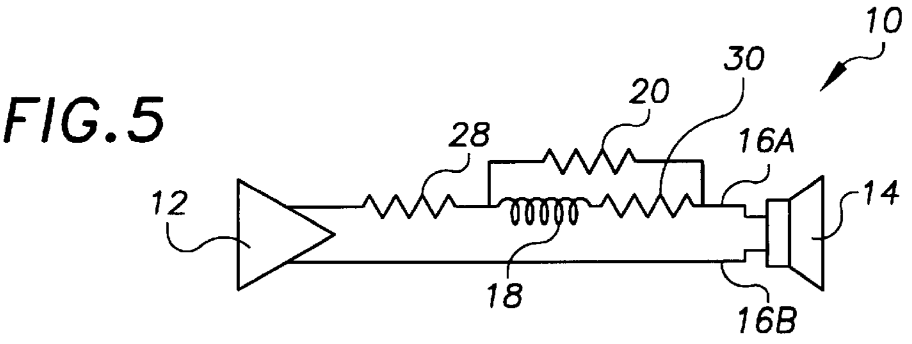
FIG. 5 is a schematic circuit diagram of the first embodiment of the variable damping circuit showing wiring of a second additional resistor.

The three preferred embodiments 10, 22, 26 of the variable damping circuit also include usage of one or more additional resistors wired in series with the coil reactive component 18, capacitor reactive component 24, or both the coil 18" and capacitor 24" reactive components when wired together in parallel with the resistor 20" as shown in the third preferred embodiment of the variable damping circuit 26. For example, in FIG. 4, the first embodiment 10 of the variable damping circuit is shown with a first additional resistor wired in series on connector 16A with the coil reactive component 18. Additionally, as shown in FIG. 5, the first embodiment 10 of the variable damping circuit is shown with the first additional resistor 28 in series with the coil reactive component 18, and a second additional resistor 30 is shown wired in series with the coil reactive component 18 and the second additional resistor 30 is also wired in parallel with the resistor 20 that is wired in parallel with the coil reactive component 18.

However, when such additional resistors 28, 30 wired in series with the reactive component and/or wired in series with the reactive component and in parallel with the resistor that is also wired in parallel with the reactive component, the resistance value of the coil 18 or capacitor 24 reactive component and the resistor wired in parallel with the reactive component and any additional resistors does not exceed fifty percent of a resistance value of the loudspeaker.

Figure 6:
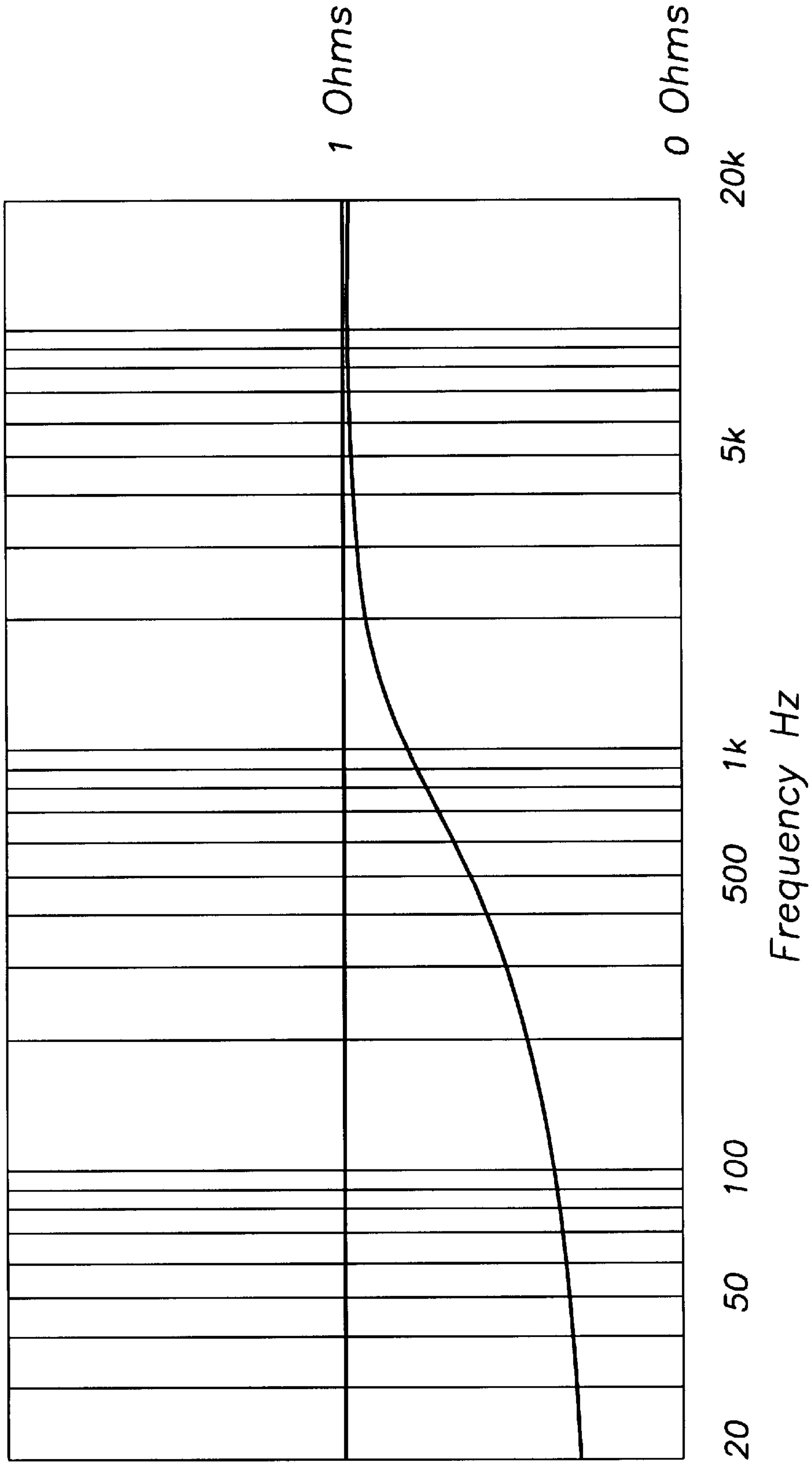
FIG. 6 is a graph showing effective resistance of an exemplary variable damping circuit as a function of frequency.

FIG. 6 is a graph showing effective resistance of an exemplary first preferred embodiment 10 of the variable damping circuit wherein the total variable damping circuit resistance of the coil and resistor at 50 HZ is about 0.4 ohms, and at 1000 HZ is 0.88 ohms, utilizing a 4 ohm speaker. The graph shows how the variable damping circuit 10 optimally tunes a loudspeaker 14 to the amplifier 12 at any working frequency range of the loudspeaker 14 utilizing back EMF generated by the loudspeaker 14.

By the phrase "reactive component" used herein it is to be understood that phrase includes any component that increases resistance with frequency and that can cooperate with a resistor connected in parallel with the reactive component to have a total resistance that is not greater that fifty percent of a total resistance of a loudspeaker. Such known reactive components may herein also be characterized as reactive component means for increasing or decreasing resistance with increasing frequency and for cooperating with a resistor connected in parallel with the reactive component means to have a total resistance that is not greater than fifty percent of a total resistance of a loudspeaker.

It should also be noted that the present variable damping circuit is incompatible with conventional frequency crossover circuits and other known frequency shaping components that seek to compensate for back EMF and other problems associated with matching a loudspeaker to an amplifier. It has also been found in use of an exemplary variable damping circuit that conventional frequency crossover circuits and other known frequency shaping circuits introduce such substantial changes to resistance of a circuit delivering power to a loudspeaker to effectively negate frequency selective damping by the variable damping circuit of the present invention.

While the present invention has been described and illustrated with respect to particular descriptions and illustrations of preferred embodiments of the variable damping circuit for a loudspeaker invention, it should be understood that the invention is not limited to the described and illustrated examples. For example, while the above described and illustrated embodiments of the variable damping circuit for a loudspeaker describe an amplifier 12 with at least one speaker 14, it is within the scope of the invention that an amplifier may direct a current through a plurality of pairs of connectors to more than the one loudspeaker 14, and the amplifier, additional loudspeaker or loudspeakers, and additional pair or pairs of connectors may also include a reactive component such as the coil 18 and/or the capacitor 24 wired in parallel with the resistor 20 on one of the additional connectors of the additional pairs of connectors, wherein the resistance value of the reactive component or components and the resistor does not exceed fifty percent of the total resistance value of the sum of all of such additional loudspeakers connected to the pair of connectors to which the reactive component or components and resistor is connected. Accordingly, reference should be made primarily to the attached claims rather than to foregoing description to determine the scope of the invention.

What is claimed is:

1. A variable damping circuit for a loudspeaker, comprising:

a. an amplifier;

b. at least one loudspeaker;

c. a pair of connectors electrically connected between the amplifier and the loudspeaker; and, d. a reactive component wired in parallel with a resistor on one of the connectors, wherein the resistance value of the reactive component and the resistor does not exceed fifty percent of a resistance value of the loudspeaker.

2. The variable damping circuit of claim 1, wherein the reactive component is a coil.

3. The variable damping circuit of claim 1, wherein the reactive component is a capacitor.

4. The variable damping circuit of claim 1, wherein the reactive component is a coil wired in parallel with the resistor and a capacitor wired in parallel with the resistor.

5. A variable damping circuit for a loudspeaker, comprising:

a. an amplifier;

b. at least one loudspeaker;

c. a pair of connectors electrically connected between the amplifier and the loudspeaker; and, d. a reactive component means wired in parallel with a resistor on one of the connectors for increasing or decreasing resistance with increasing frequency and for cooperating with the resistor connected in parallel with the reactive component means to have a total resistance that is not greater than fifty percent of a total resistance of a loudspeaker.

6. The variable damping circuit of claim 5, wherein the reactive component is a coil.

7. The variable damping circuit of claim 5, wherein the reactive component is a capacitor.

8. The variable damping circuit of claim 5, wherein the reactive component is a coil wired in parallel with the resistor and a capacitor wired in parallel with the resistor.

9. The variable damping circuit of claim 5, wherein an additional resistor is wired in series with the reactive component means, and a total resistance of the reactive component means, the resistor and the additional resister is not greater than fifty percent of a total resistance of a loudspeaker.

10. The variable damping circuit of claim 5, wherein an additional resistor is wired in series with the reactive component means and the additional resistor is also wired in parallel with the resistor that is wired in parallel with the reactive component means, and a total resistance of the reactive component means, the resistor and the additional resister is not greater than fifty percent of a total resistance of a loudspeaker.

11. The variable damping circuit of claim 5, wherein a first additional resistor is wired in series with the reactive component means, and a second additional resistor is wired in series with the reactive component means and is also wired in parallel with the resistor that is wired in parallel with the reactive component means, and a total resistance of the reactive component means, the resistor and the first and second additional resisters is not greater than fifty percent of a total resistance of a loudspeaker.

* * * * *